US007853887B2

(12) United States Patent
Ossesia

(10) Patent No.: US 7,853,887 B2
(45) Date of Patent: Dec. 14, 2010

(54) DETECTION AND PREVIEW OF GRAPHICAL ELEMENTS WITHIN A GRAPHIC

(75) Inventor: Michel G. Ossesia, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 840 days.

(21) Appl. No.: 11/768,325

(22) Filed: Jun. 26, 2007

(65) Prior Publication Data

US 2009/0006990 A1 Jan. 1, 2009

(51) Int. Cl.
*G06F 3/00* (2006.01)

(52) U.S. Cl. ........................ 715/764; 715/700; 382/176

(58) Field of Classification Search ................. 715/700, 715/764, 765; 382/173, 176, 181, 190, 195
See application file for complete search history.

(56) References Cited

U.S. PATENT DOCUMENTS

| | | | | | |
|---|---|---|---|---|---|
| 5,437,008 | A | | 7/1995 | Gay et al. | |
| 5,542,052 | A | | 7/1996 | Deutsch et al. | |
| 5,544,291 | A | | 8/1996 | Gilley et al. | |
| 5,577,189 | A | | 11/1996 | Gay et al. | |
| 5,619,592 | A | * | 4/1997 | Bloomberg et al. | 382/175 |
| 5,745,122 | A | | 4/1998 | Gay et al. | |
| 5,745,666 | A | | 4/1998 | Gilley et al. | |
| 5,754,873 | A | | 5/1998 | Nolan | |
| 5,809,167 | A | * | 9/1998 | Al-Hussein | 382/190 |
| 5,825,919 | A | * | 10/1998 | Bloomberg et al. | 382/177 |
| 6,031,544 | A | | 2/2000 | Yhann | |
| 6,366,361 | B1 | | 4/2002 | Dermer et al. | |
| 6,377,712 | B1 | | 4/2002 | Georgiev et al. | |
| 6,385,350 | B1 | | 5/2002 | Nicholson et al. | |
| 6,415,278 | B1 | | 7/2002 | Sweet et al. | |
| 6,567,799 | B2 | | 5/2003 | Sweet et al. | |
| 6,661,919 | B2 | | 12/2003 | Nicholson et al. | |
| 6,721,446 | B1 | | 4/2004 | Wilensky et al. | |
| 6,789,080 | B1 | | 9/2004 | Sweet et al. | |
| 6,865,301 | B1 | | 3/2005 | Harris | |
| 6,912,298 | B1 | | 6/2005 | Wilensky | |
| 6,919,888 | B1 | | 7/2005 | Perani et al. | |
| 6,970,749 | B1 | | 11/2005 | Chinn et al. | |
| 7,082,223 | B1 | | 7/2006 | Harris | |
| 7,126,578 | B1 | | 10/2006 | Hamburg | |
| 7,191,405 | B1 | | 3/2007 | Jaramillo | |
| 7,218,330 | B1 | | 5/2007 | Winkenbach et al. | |
| 2008/0175484 | A1 | * | 7/2008 | Hartmann et al. | 382/195 |

OTHER PUBLICATIONS

Pixel, Wikipedia, downloaded from the Interenet on May 24, 2007, pp. 1-5.
Raster Graphics, Wikipedia, downloaded from the Internet on May 24, 2007, pp. 1-2.
PointShop3D, tutorial, Computer Graphics Laboratory, ETH Zurich, downloaded from the Internet on Jun. 22, 2007, pp. 1-5.

* cited by examiner

*Primary Examiner*—X. L Bautista

(57) ABSTRACT

In an embodiment, hidden graphical elements in a graphic are detected by generating a first bitmap based on a plurality of graphical elements and a second bitmap based on a first subset of the plurality of graphical elements where the first subset omits a first graphical element of the plurality of elements and includes a second graphical element of the plurality of elements. The first bitmap is then compared with the second bitmap to determine if they match. If they match, the first graphical element is considered to be hidden by the second graphical element.

20 Claims, 14 Drawing Sheets

Night is generally my time for walking. In the summer I often leave home early in the morning, and roam about fields and lanes all day, or even escape for days or weeks together...

FIG. 2

310

Night is [redacted] my time for walking. In the summer I often leave home early in the morning, and roam about fields and lanes all day, or even escape for days or weeks together...

FIG. 3

410

Night is generally my time for walking. In the summer I often leave home early in the morning, and roam about fields and lanes all day, or even escape for days or weeks together...

FIG. 4

DETECTION AND PREVIEW OF GRAPHICAL ELEMENTS WITHIN A GRAPHIC

BACKGROUND

A graphic is a visual presentation made on some media, such as a computer display or paper. A graphic typically comprises various graphical elements which may include textual elements and non-textual elements. Examples, of non-textual elements include pictures, drawings, geometric shapes and so on. Examples of textual elements include letters, numbers, punctuation marks and so on.

It is not uncommon for one or more graphical elements to overlap and sometimes completely obscure other graphical elements in a graphic. For example, a rendering of an electronic document may have textual elements that are obscured by non-textual graphical elements (e.g., rectangles) that are placed over the textual elements to redact the text associated with the textual elements and prevent the text from being viewed when the document is rendered. Here, a user may run a software application to place non-textual elements, such as rectangles, over the text elements to obscure or hide the text from viewing. The user may save the document in a file which includes the textual elements and the non-textual elements. When the document is rendered from the file on a computer system, the textual elements are typically rendered followed by the non-textual elements. If overlaid in a same region, rendering the non-textual elements in this order causes the text to be obscured or hidden.

SUMMARY

One problem with redacting text, as described above, is that it may give a user a false sense of security that the text has been truly redacted. For example, assume a first user (redactor) uses a software application to redact text in an electronic document and generate a file containing the document, as described above. Since the file contains both the textual elements that represent the text and the non-textual elements that represent the rectangles used to redact the text, a second user (viewer) that has access to the file may run a software application to undo the redaction by simply removing the non-textual elements that are obscuring the text from the file in order to reveal the text. Since the redactor may not be aware that the file contains both graphical elements, the redactor may think that he has truly redacted the text when in fact the text has not been completely removed from the graphic. As can be seen in the above example, an incomplete redaction of matter may result in an unwanted display of the matter.

Embodiments described herein overcome deficiencies associated with the above by providing an accurate approach for detecting and revealing hidden graphical elements in a graphic. Thus, according to embodiments described herein, a user and/or other entity can be apprised of whether graphical elements in a graphic (e.g., graphical elements that represent text) have been properly redacted.

In an embodiment, an entity, such as a processor, can detect one or more hidden graphical elements in a graphic by (1) generating a first bitmap based on a plurality of graphical elements, (2) generating a second bitmap based on a subset of the plurality of graphical elements where the subset omits a first graphical element of the plurality of elements and includes a second graphical element of the plurality of elements, and (3) comparing the first bitmap with the second bitmap. If they match, the first graphical element is hidden.

Note that the Summary section contained herein is not intended to specify every embodiment and/or incrementally novel aspect of the present disclosure or claimed invention. Instead, the Summary section is intended to provide a preliminary discussion of various embodiments of the invention and corresponding points of novelty over conventional techniques. For additional details and/or possible perspectives (permutations) of the invention, the reader is directed to the Detailed Description section and corresponding figures of the present disclosure, as further discussed below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating embodiments, principles and concepts of the invention.

FIG. 2 illustrates an example of a display of a graphic comprising a plurality of textual elements.

FIG. 3 illustrates an example of a display of a graphic comprising a plurality of textual elements and a non-textual element.

FIG. 4 illustrates an example of how text represented by hidden textual elements may be revealed.

DETAILED DESCRIPTION

Figure 1:
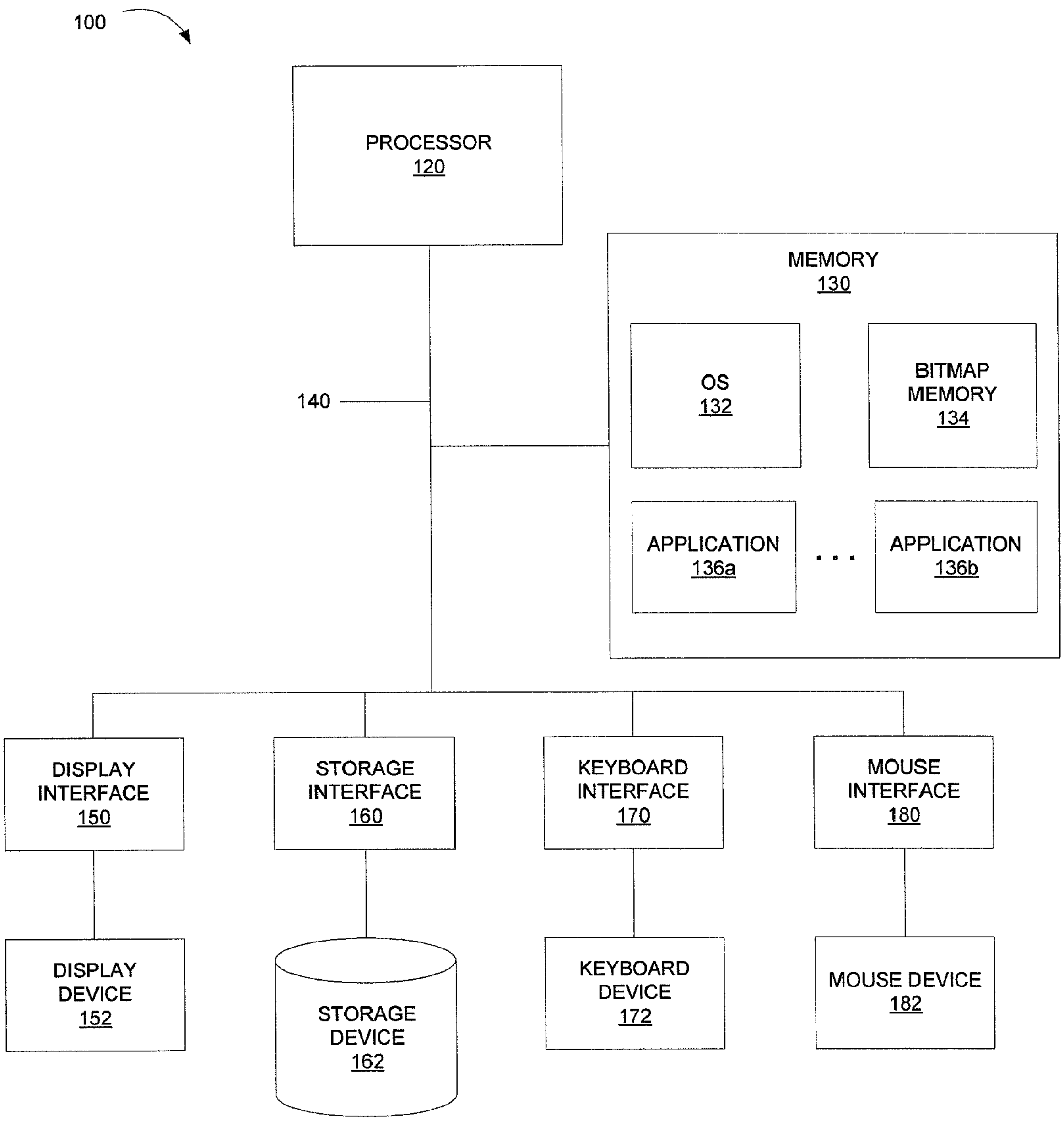
FIG. 1 is a block diagram of an example of a computer system that may be used with techniques described herein.

FIG. 1 is a high-level block diagram of an example of a computer system 100 that may be used with techniques described herein. Referring to FIG. 1, system 100 comprises a processor 120 coupled to memory 130 and various interfaces via a local bus 140. The interfaces include a display interface 150, a storage interface 160, a keyboard interface 170 and a mouse interface 180. It should be noted that computer system 100 is one example of a computer system that may be used with techniques described herein. Computer systems of varying types and complexities may be used with techniques described herein. An example of a computer system that may be used with techniques described herein is a personal computer (PC) system, such as a Dimension series computer system available from Dell Incorporated, Round Rock, Tex.

The processor 120 comprises processing circuitry for, inter alia, executing instructions and manipulating data contained in memory 130 including instructions and data that implement aspects of techniques described herein. The processor 120 may be a conventional processor, such as an Intel Pentium processor, available from Intel Corporation, Santa Clara, Calif. The local bus 140 is a point-to-point interconnect bus configured to couple various entities contained in system 100 including the processor 120, memory 130 and interfaces 150, 160, 170 and 180 and enable data and signals to be transferred between these entities.

The display interface 150 may be a conventional display interface (e.g., a graphics card) that comprises circuitry configured to enable the processor 120 to display information on the display device 152, such as a desktop environment, windows, icons, graphics, text and so on. Display device 152 may be a conventional display device, such as a Cathode Ray Tube (CRT), Liquid Crystal Display (LCD), touch screen and so on.

The storage interface 160 may be a conventional storage interface comprising circuitry configured to interface storage devices, such as storage device 162, to bus 140 and enable data and signals to be transferred between the storage devices and entities on bus 140. Storage device 162 may be a non-volatile data storage, such as a disk drive, flash drive and so on, that is configured to store information, such as data and computer-executable instructions, in files.

The keyboard interface 170 may be a conventional keyboard interface that comprises circuitry configured to interface a keyboard device 172 with system 100 and enable data and signals to be transferred between the keyboard device 172 and the system 100. Keyboard device 172 may be a conventional keyboard, such as a 104-key PC keyboard, configured to enable, e.g., a user (not shown) to input information into system 100.

Mouse interface 180 may be a conventional mouse interface that comprises circuitry configured to interface mouse device 182 with system 100 and enable data and signals to be transferred between the mouse device 182 and the system. Mouse device 182 is a pointing device, such as a conventional computer mouse, which may be positioned to various locations of a display (e.g., a desktop environment) that is displayed on display unit 152. The position of the mouse device 182 may be indicated by a mouse cursor that is displayed in the display. In addition, coordinates (e.g., X-axis and Y-axis coordinates) that represent the location of the mouse device 182 may be made available to the processor 120 by the mouse interface 180. The mouse device 182 contains one or more buttons which may be selected by a user using the mouse device 182. A button selection may be made available to the processor 120 by the mouse interface 180. It should be noted that other pointing devices, such as a styluses, light-pens and so on, may be used with techniques described herein.

Memory 130 is a computer-readable medium that may be implemented as a conventional random access memory (RAM) comprising one or more RAM devices, such as dynamic RAM (DRAM) devices. Memory 130 is configured to hold various software and data including operating system (OS) 132, one or more applications 136 and bitmap memory 134. The OS 132 may be a conventional operating system comprising computer-executable instructions and data that implement various operating system functions, such as scheduling processes for execution on the processor 120 and managing various entities contained in the system 100. Moreover, OS 132 may contain computer-executable instructions and data that implement aspects of techniques described herein. Examples of operating systems that may be used with techniques described herein include the Linux operating system which is available from many sources including Red Hat Corporation, Raleigh N.C. and the Microsoft Windows operating system which is available from Microsoft Corporation, Redmond, Wash.

The applications 136 may be software applications that execute under control of the OS 132. The applications 136 may contain computer-executable instructions and data that may include computer-executable instructions and data that implement aspects of techniques described herein. The applications may utilize windows which may be displayed in a desktop environment that is displayed on display device 152.

Bitmap memory 134 is an area of memory 130 that may be configured to hold various bitmaps that are rendered by system 100. The bitmaps may be displayed by system 100 on display device 152 for viewing by, for example, a user. Alternatively, the bitmaps may be printed on a printer (not shown) to provide a hardcopy of the image.

A bitmap, as used herein, relates to data that may be used to represent a graphic. The data may represent and/or define a state of pixels that when taken collectively may be used to depict various graphical elements. As will be described further below, a bitmap may contain pixels configured to represent various graphical elements, including textual elements and non-textual elements. It should be noted that in other embodiments, the bitmap memory 134 is located elsewhere in a computer system, such as in a memory contained in a display interface, such as display interface 150.

Each pixel in a bitmap may comprise one or more values that may represent the intensity of the pixel or an intensity of colors of the pixel. For example, a pixel may comprise red, green and blue (RGB) values that represent intensities of the colors red, green and blue, respectively, of the pixel. Likewise, for example, a pixel may comprise four values that represent intensities of the colors cyan, magenta, yellow and black. It should be noted that the values associated with a pixel may be used to represent other aspects of the pixel.

Functions performed by the system 100, including functions that may implement aspects of techniques described herein, may be implemented in whole or in part using some combination of hardware and/or software. It should be further noted that computer-executable instructions and/or computer data that implement aspects of techniques described herein may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to transfer computer-executable instructions and/or data that implement aspects of techniques described herein, e.g., over a communications network, such as the Internet.

FIG. 2 illustrates an example of a display of a graphic comprising a plurality of textual elements. Referring to FIG. 2, each textual element in the graphic may be configured to represent a single textual character. For example, in FIG. 2, the word "generally" may comprise separate textual elements that represent the textual characters "g", "e", "n", "e", "r", "a", "l", "l" and "y" in the word "generally". As will be described further below, each textual element may be represented in a bitmap as a plurality of pixels which may include background pixels and non-background pixels.

FIG. 3 illustrates an example of a display of a graphic comprising a plurality of textual elements and a non-textual element. The non-textual element is overlaid over various textual elements to hide the text associated with the textual elements. In this example, the non-textual element 310 represents a rectangular box that is overlaid over the text "generally" to make the text appear to be redacted from the graphic. The text is redacted by overwriting the pixels associated with the textual elements that represent the text with pixels associated with the non-textual element. Specifically, as the graphic is rendered, pixels in the bitmap that are associated with the textual elements are initially configured to hold the text "generally". The pixels are later overwritten when the non-textual element that represents the rectangle is rendered in the bitmap. Overwriting the text with the rectangle makes the text appear to have been redacted in the bitmap.

It should be noted that a graphical element may be hidden in other ways. For example, a graphical element may be hidden because its coloring matches that of elements rendered before it or the coloring of the graphical element matches a background color. For example, the graphical element may be rendered at a particular color on top of another element that was rendered at the same color. For example, text rendered in white may appear hidden if it is rendered on top of a white rectangle that was rendered prior to the text. Also, for example, text rendered in white may appear hidden if the background it is rendered on is also white.

FIG. 4 illustrates an example of how text represented by hidden textual elements may be revealed. As will be described further below, the text (e.g., the word "generally") may be revealed by setting background and non-background pixels associated with the hidden textual elements (in region 410) to certain colors to reveal the text.

Figure 5:
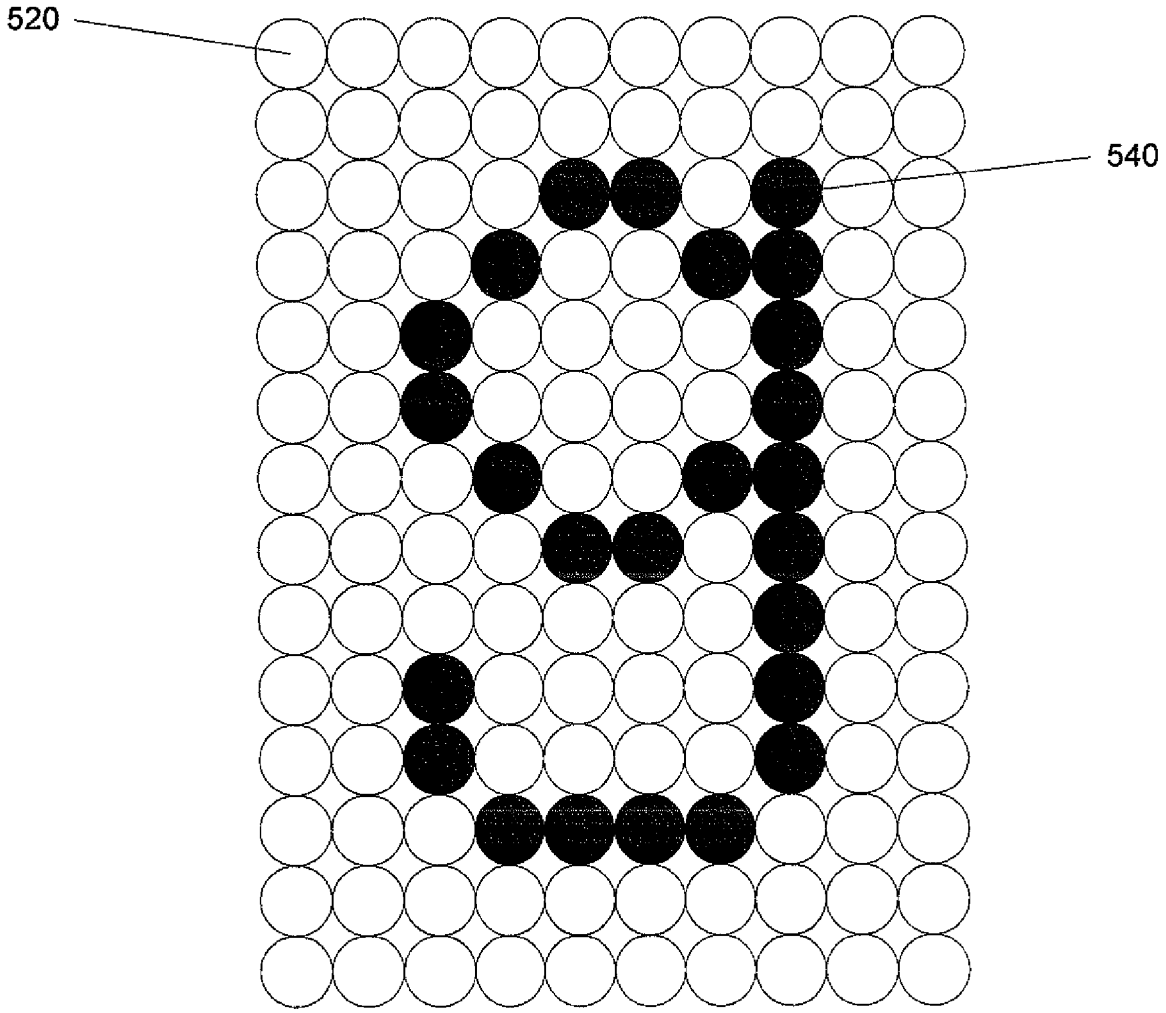
FIG. 5 illustrates an example of a plurality of pixels that are configured to represent a textual element in a bitmap.

FIG. 5 illustrates an example of a plurality of pixels that are configured to represent a textual element in a bitmap. Referring to FIG. 5, in this example, the text represented by the textual element is the lower-case letter "g". The plurality of pixels, as shown in FIG. 5, include background pixels, such as pixel 520 and non-background pixels, such as pixel 540. The non-background pixels are pixels that are used to depict the text represented in the textual element and the non-background background pixels include pixels that make up the background for the text. Note that the non-background pixels are set to a color (or shading) that is different than the background pixels to enable the text to be differentiated from the background.

Figure 6:
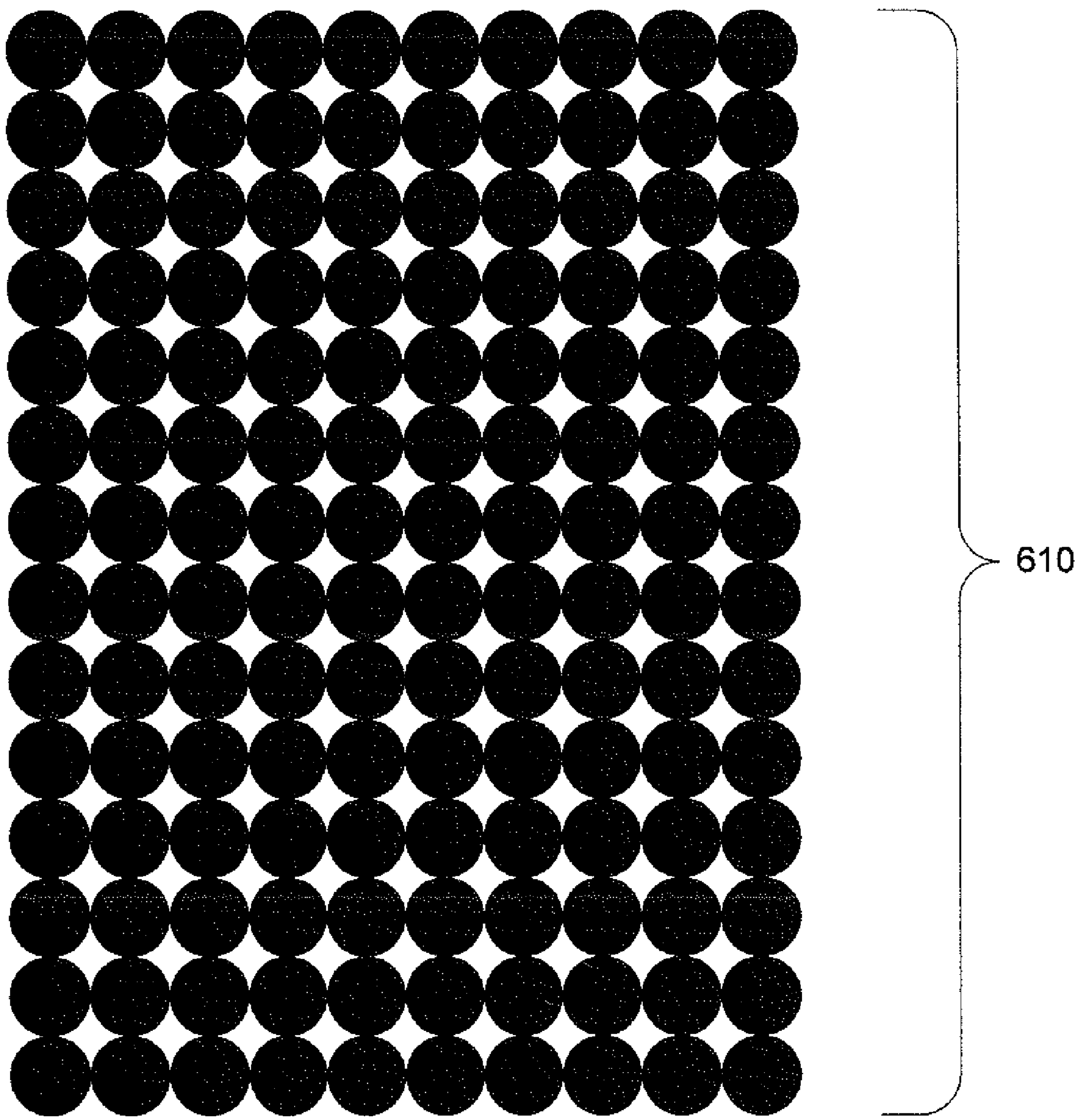
FIG. 6 illustrates an example of a plurality of pixels that are configured to represent a textual element that is hidden.

FIG. 6 illustrates an example of a plurality of pixels that are configured to represent a textual element that is hidden. For example, in this example, the non-textual element (in region 610) may be rendered in the graphic after the textual element and completely obscures the textual element. Specifically, the non-textual element may first be rendered and the pixels are configured to depict the text character represented by the textual element. Later, the non-textual element may be rendered over the location of the textual element in the bitmap, which causes the pixels associated with the textual element to be overwritten by the pixels associated with the non-textual element. This, in turn, causes the textual element to be hidden.

Figure 7:
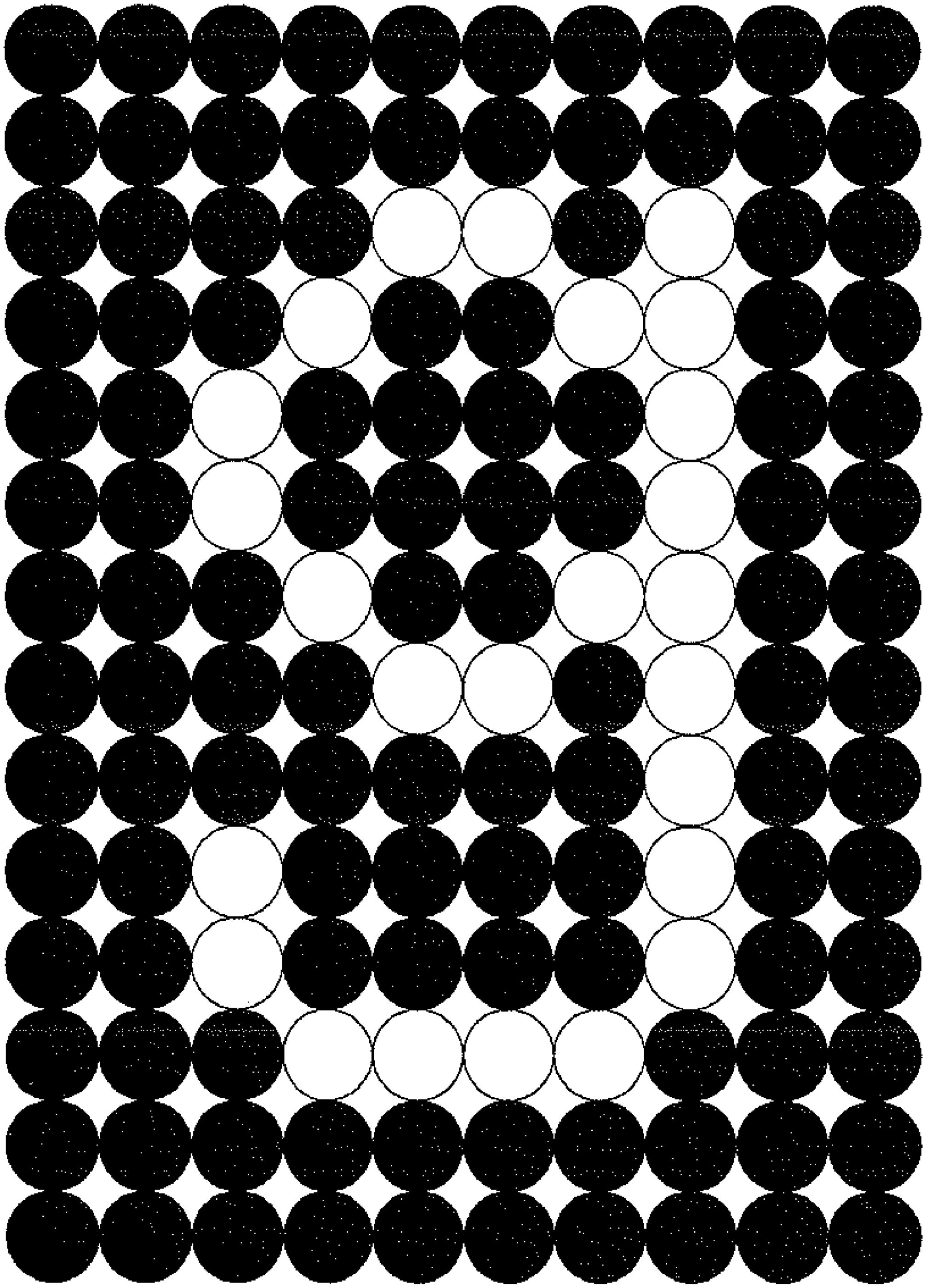
FIG. 7 illustrates an example of a plurality of pixels that are configured to reveal text represented by a textual element that is hidden.

FIG. 7 illustrates an example of a plurality of pixels that are configured to reveal text represented by a textual element that is hidden. Referring to FIG. 7, after both the textual element and non-textual element have been rendered in the bitmap, non-background pixels associated with the textual element are colored a different color than pixels associated with the non-textual element to reveal the hidden textual element. For example, the textual element may be first rendered, as described above. The non-textual element may then be rendered causing the pixels associated with the textual element to be overwritten, as also described above, thus causing the textual element to appear to be hidden. Afterwards, as will be described below, non-background pixels associated with the textual element are set to a color that is different than the color of the pixels associated with the non-textual element to cause the hidden text represented by the textual element to be revealed. Thus, a respective entity (e.g., a user) may identify the specific text information that was hidden.

Figure 8:
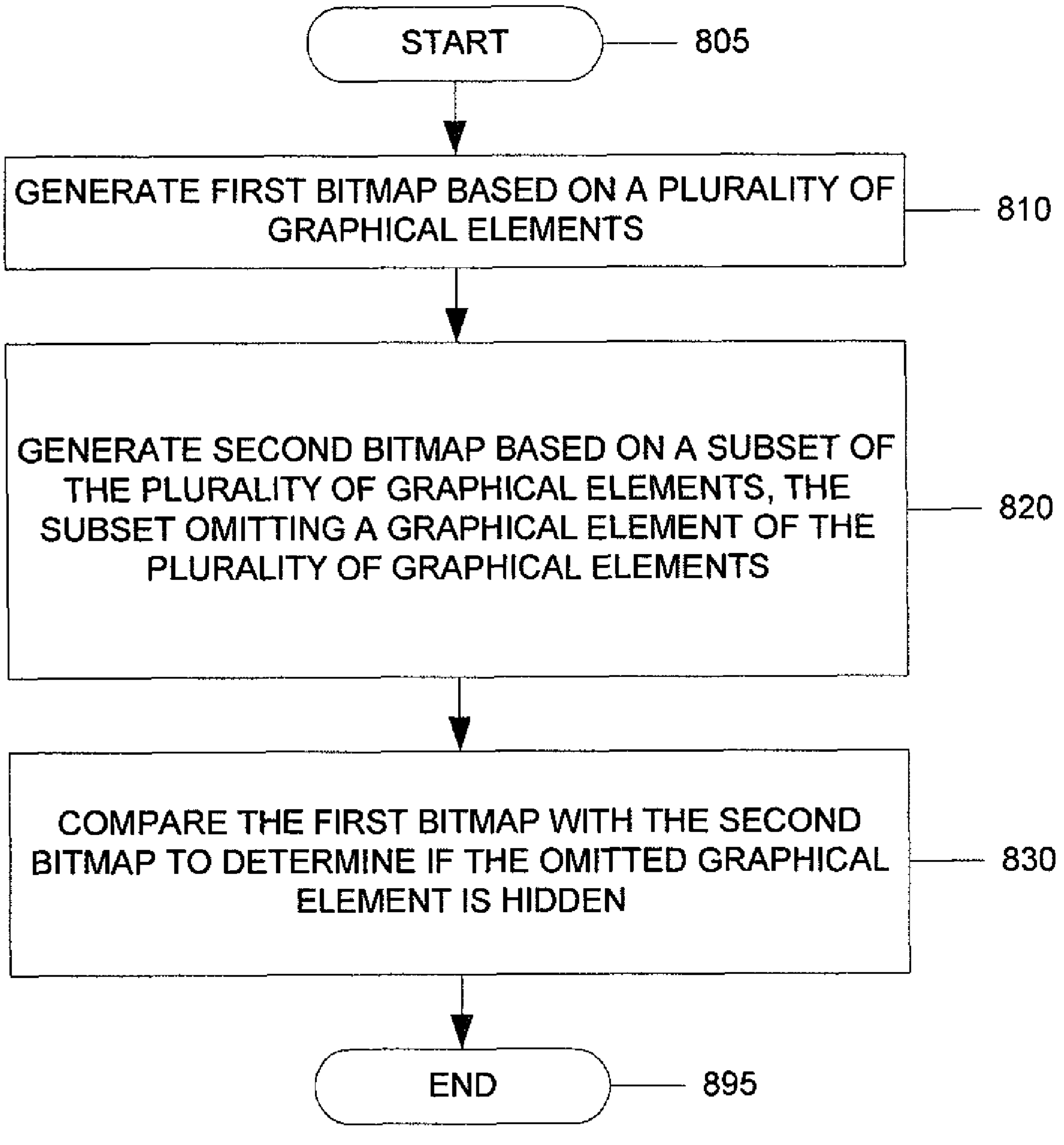
FIG. 8 is a flow chart of a sequence of steps that may be used to detect a hidden graphical element in a graphic.

FIG. 8 is a flow chart of a sequence of steps that may be used to detect a hidden graphical element in a graphic. Referring to FIG. 8, the sequence begins at step 805 and proceeds to step 810 where a first bitmap is generated based on a plurality of (e.g., all) graphical elements contained in the graphic. At step 820, a second bitmap is generated based on a subset of the plurality of graphical elements where the subset omits a graphical element of the plurality of graphical elements. At step 830, the first bitmap is compared with the second bitmap to determine if the omitted graphical element is hidden. In an embodiment, pixels in the first bitmap are compared with pixels in the second bitmap. The omitted graphical element may be considered hidden if the first bitmap matches the second bitmap. Otherwise, if the two bitmaps do not match, the omitted graphical element may be considered either partially hidden or completely visible. The sequence ends at step 895.

The following example, illustrates an embodiment of the above-described steps as implemented in system 100. In the present example, assume that a particular graphic contains a textual element and a non-textual element that completely obscures the textual element in a graphic. Now referring to FIGS. 1 and 8, in the embodiment, the processor 120 generates a first bitmap in the bitmap memory 134 based on both the textual element and the non-textual element contained in the graphic (step 810). Note that since the textual element is completely obscured by the non-textual element, the pixels associated with the textual element are overwritten by pixels associated with the non-textual element in the first bitmap.

The processor 120 then generates a second bitmap in the bitmap memory 134 that includes the non-textual element but which omits the textual element (step 820). Next, the processor 120 compares the first bitmap with the second bitmap to determine if the textual element is hidden by the non-textual element. Since, as noted above, the textual element in the first bitmap was completely overwritten by the non-textual element, the first bitmap appears to contain only the non-textual element. Recall that the second bitmap also contains only the non-textual element. Thus, the pixels contained in the first bitmap match the pixels contained in the second bitmap. Since the pixels match in the two bitmaps, the processor 120, concludes the textual element is hidden. Note that the above-described technique may be repeated for each of multiple graphical elements contained in a graphic to identify which, if any, of the graphical elements in the graphic are hidden.

The above may be used to detect a graphical element that is at least partially visible by another graphical element. Here, comparing the first bitmap with the second bitmap, as described above, would indicate that the bitmaps do not match. Hence, the processor could conclude that the textual element is at least partially visible.

Figure 9A:
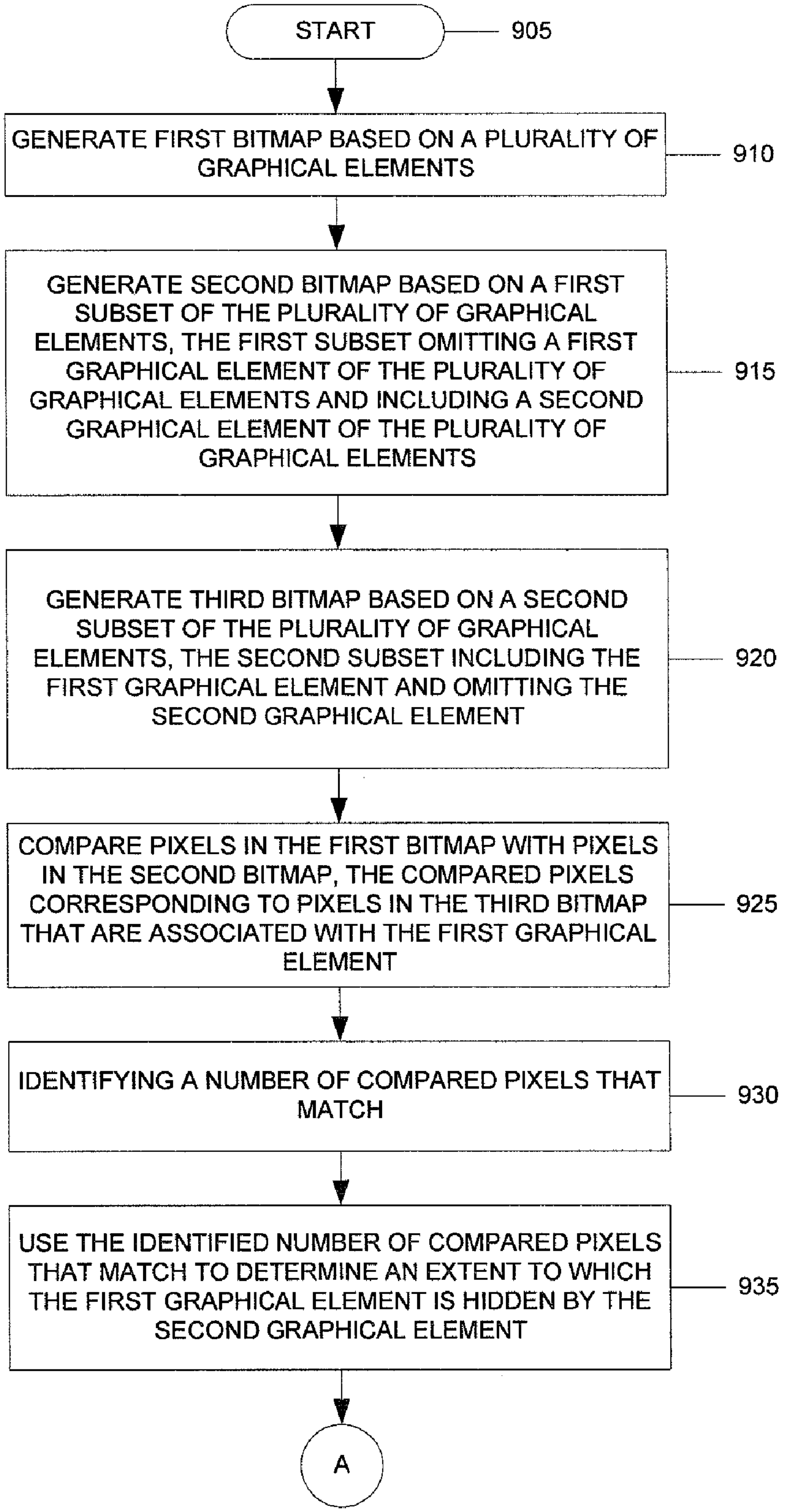
FIGS. 9A-B are a flow chart of a sequence of steps that may be used to detect and display a graphical element that is hidden.
Figure 9B:
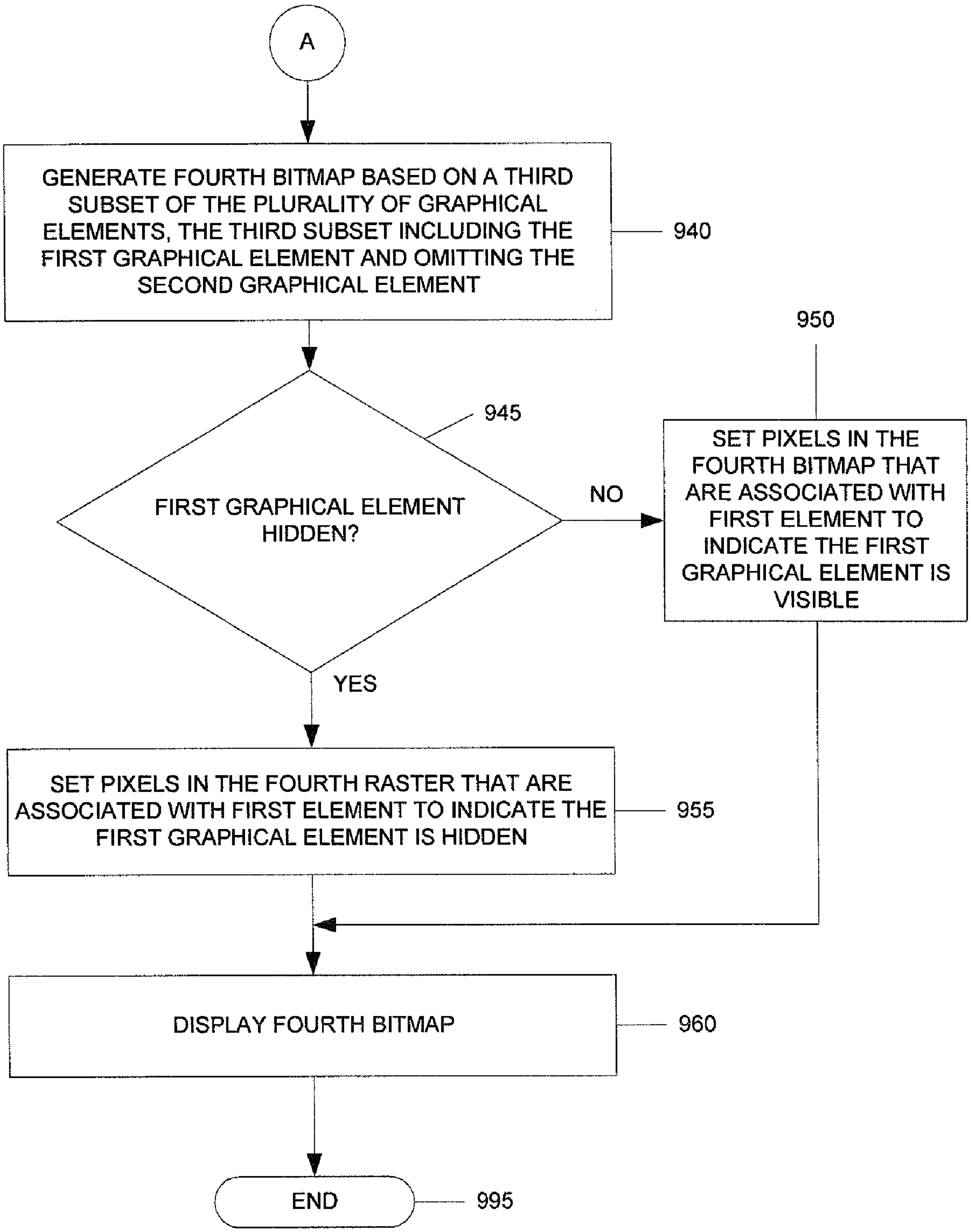
Figure 10A:
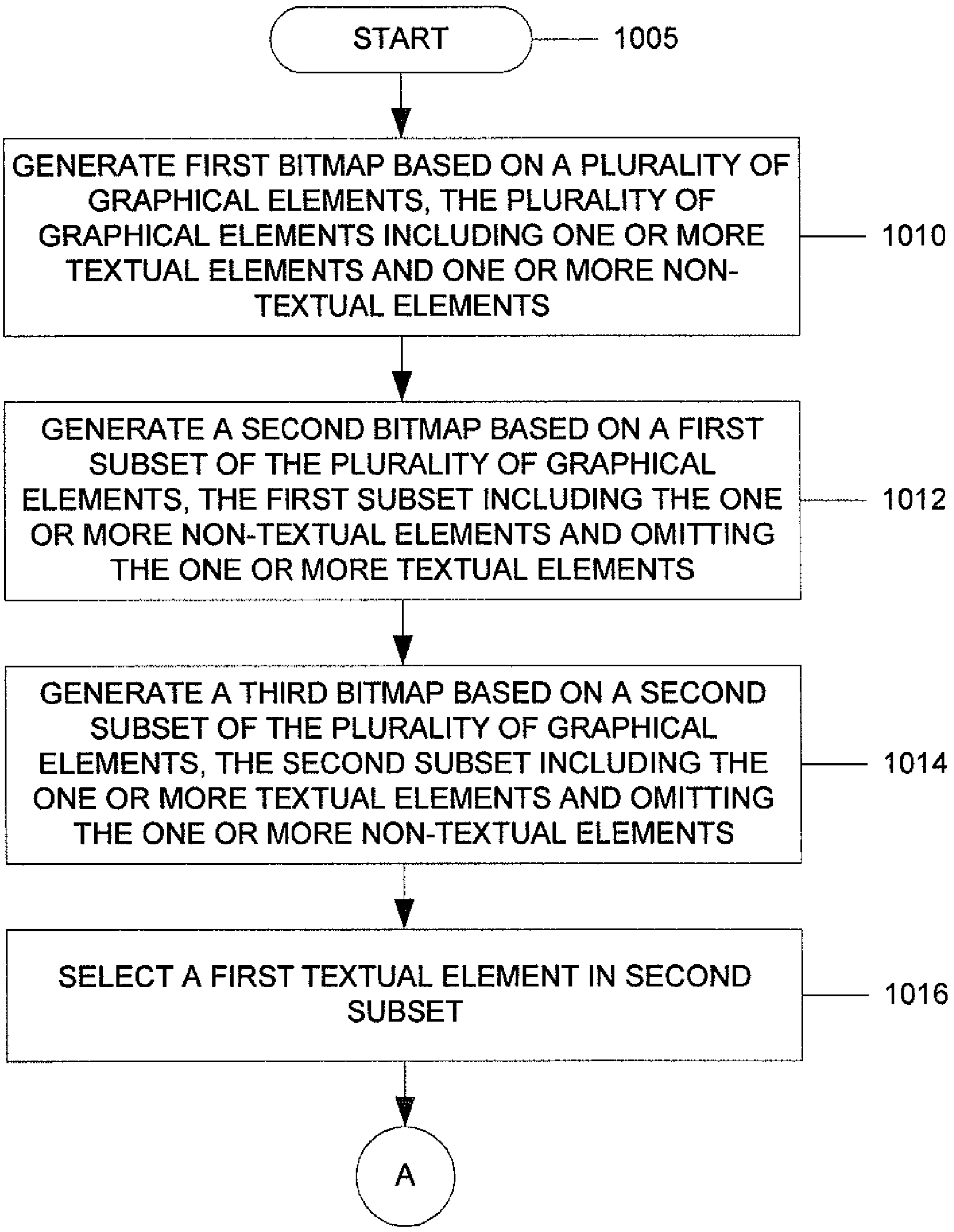
FIGS. 10A-D are a flow chart of a sequence of steps that may be used to detect and display one or more textual elements that are hidden.
Figure 10B:
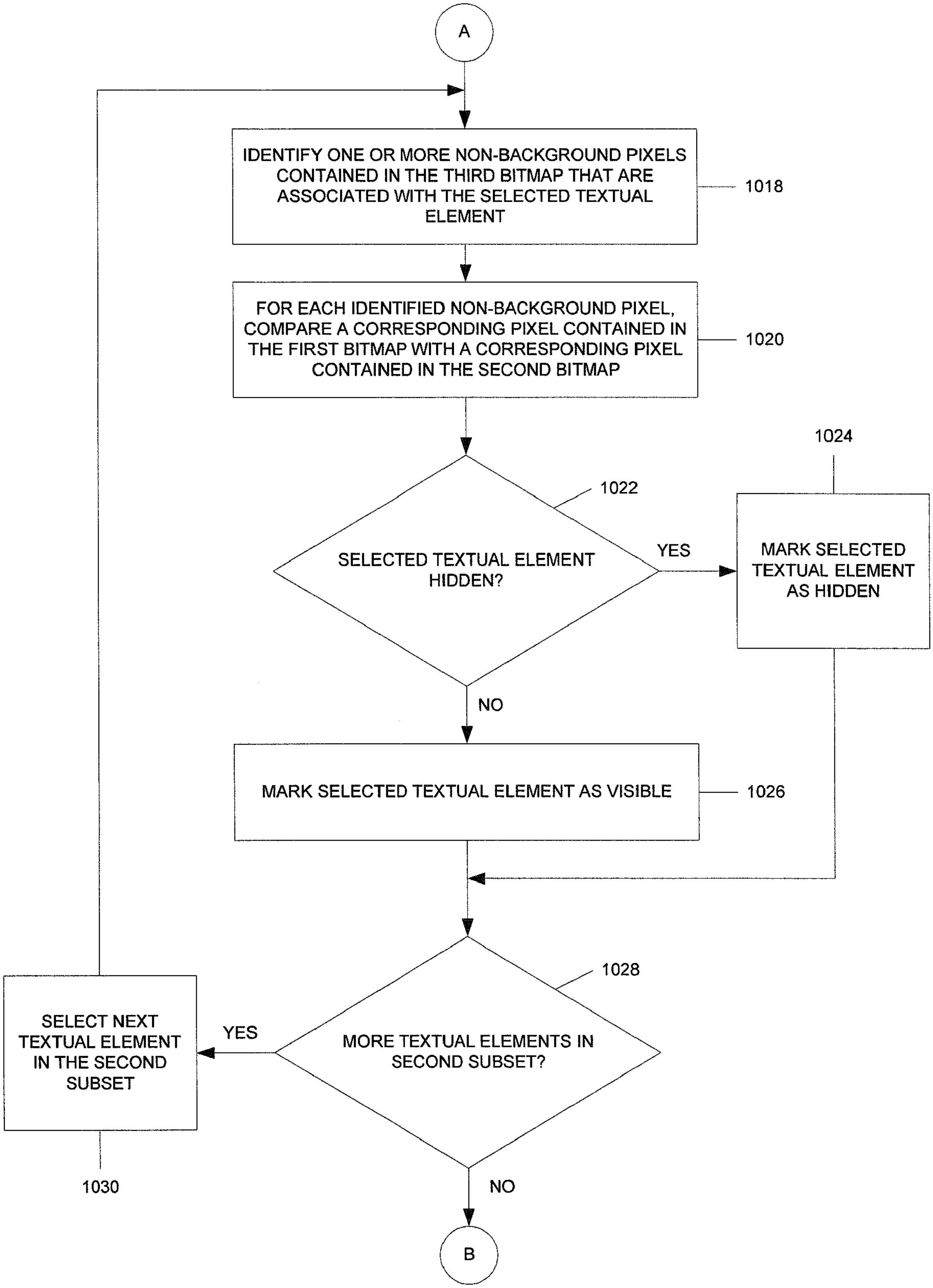
Figure 10C:
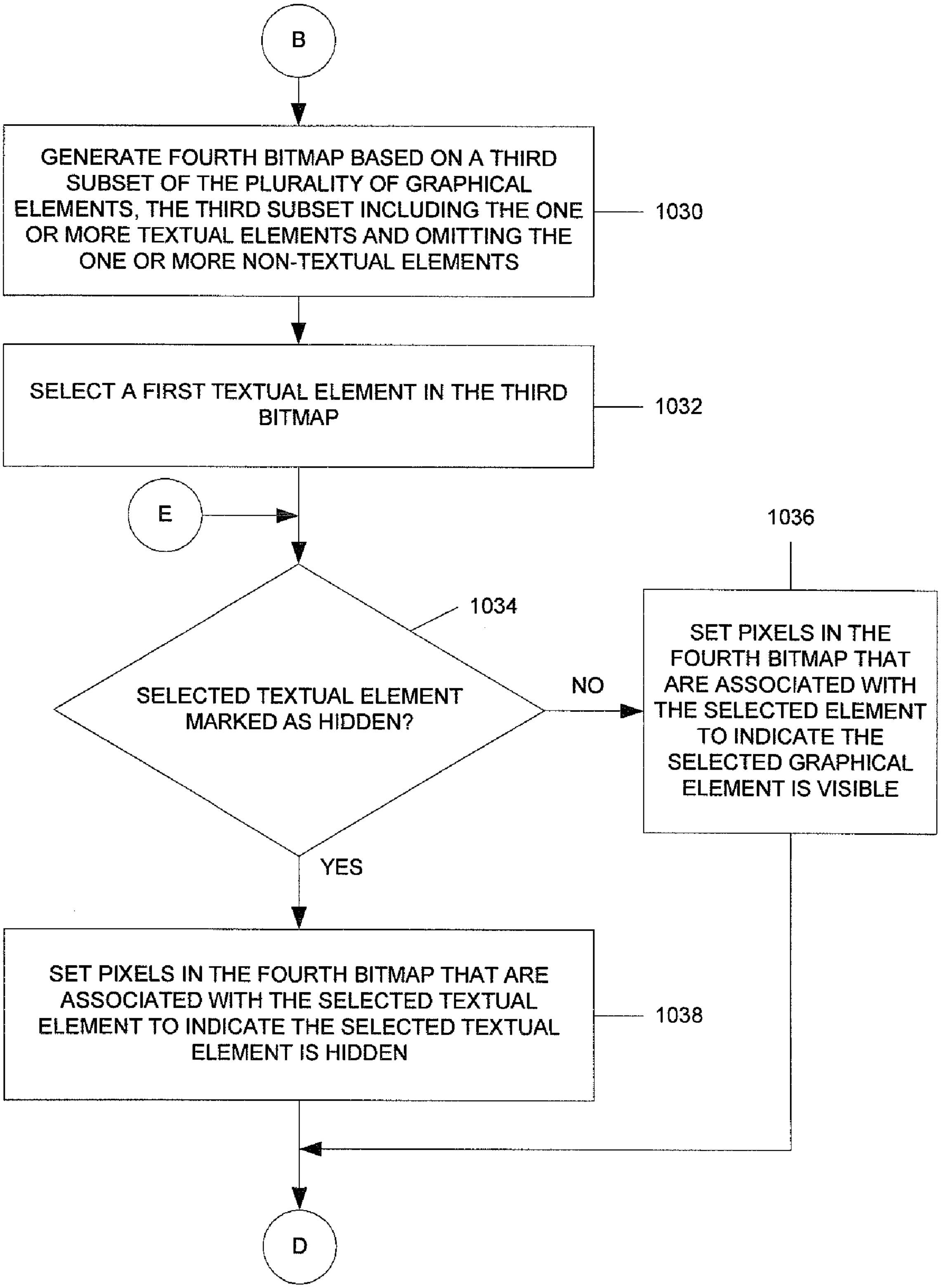
Figure 10D:
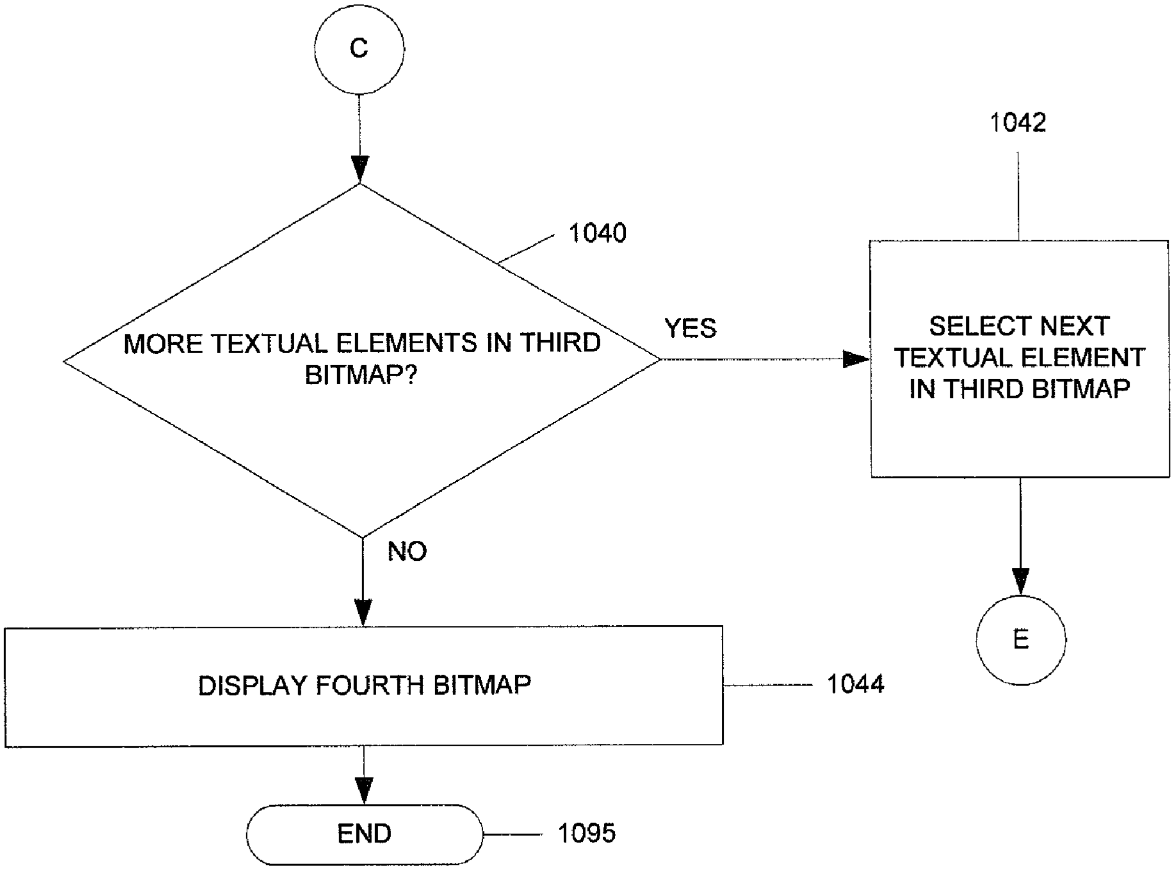

FIGS. 9A-B are a flow chart of a sequence of steps that may be used to detect and display a graphical element that is hidden. Referring to FIGS. 9A-B, the sequence begins at step 905 and proceeds to step 910 where a first bitmap is generated based on a plurality of graphical elements contained in the graphic. At step 915, a second bitmap is generated based on a first subset of the plurality of graphical elements. The first subset omits a first graphical element of the plurality of graphical elements and includes a second graphical element of the plurality of graphical elements. At step 920, a third bitmap is generated based on a second subset of the plurality of graphical elements. The second subset includes the first graphical element and omits the second graphical element.

At step 925, pixels in the first bitmap are compared with pixels in the second bitmap. The compared pixels in the first and second bitmaps correspond to pixels in the third bitmap that are associated with the first graphical element. Here, the third bitmap may be thought of as a template that may be used to identify which pixels are compared in the first and second bitmaps. In other words, at this step, the third bitmap image may be used to identify the location of corresponding pixels in the first and second bitmaps to compare for purposes of determining whether the first graphical element is hidden. Note that use of the third bitmap to identify which pixels are to be compared (e.g., to identify a region of interest in the first and second bitmaps) reduces the number of pixels that need to be compared to determine if the first graphical element is hidden.

At step 930, a number corresponding to the number of compared pixels that match is identified. This number may be identified by counting the number of compared pixels that match. At step 935, the identified number is used to determine a degree to which the first graphical element is hidden by the second graphical element. The degree may be expressed as a percentage of pixels that are obscured in the first graphical element by the second graphical element. This percentage may be determined by dividing the identified number of pixels that match by a total number of pixels in the first graphical element. The amount may be used to determine if the first graphical element is hidden. For example, if the above-described percentage exceeds a certain predetermined threshold percentage, the first graphical element may be considered hidden. Likewise, in this example, if the percentage is less than or equal to the predetermined threshold percentage, the first graphical element may be considered visible.

At step 940 (FIG. 9B), a fourth bitmap is generated based on a third subset of the plurality of graphical elements. The third subset includes the first graphical element and omits the second graphical element. At step 945, a check is performed to determine if the first graphical element is hidden. As noted above, the degree to which the first graphical element is hidden by the second graphical element may be used to determine if a graphical element is considered hidden or visible.

If the graphical element is hidden, the sequence proceeds to step 955 where background and non-background pixels in the fourth bitmap that are associated with the first graphical element are set to indicate the first graphical element is hidden. Here, the background and non-background pixels may be set to special colors to indicate that the graphical element is hidden. The sequence then proceeds to step 960 where the fourth bitmap is displayed. The sequence ends at step 995.

If at step 945, it is determined that the graphical element is visible, the sequence proceeds to step 950 where pixels in the fourth bitmap that are associated with the first graphical element are set to indicate the first graphical element is visible. The sequence then proceeds to step 960.

Note that by choosing appropriate coloring for the hidden and visible graphical elements represented in the fourth bitmap, one can reveal (e.g., display) just the hidden elements (e.g., the color of the pixels associated with the visible graphical elements are set to the background color), just visible elements (e.g., the color of the pixels associated with the hidden elements are set to the background color) or both hidden and visible graphical elements (e.g., the colors of the pixels associated with the hidden graphical elements and the graphical visible elements are set to a color that is different than the background color).

The following example, illustrates an embodiment of the above-described steps as implemented in system 100. For example, assume, as above, that a particular graphic contains a textual element and a non-textual element that completely obscures the textual element. Now referring to FIGS. 1 and 9A-B, in an embodiment, the processor 120 generates a first bitmap in the bitmap memory 134 based on the textual and the non-textual elements contained in the graphic (step 910). Note that since the textual element is completely obscured by the non-textual element, the textual element is completely overwritten by the non-textual element in the first bitmap.

The processor 120 then generates a second bitmap in the bitmap memory 134 that includes the non-textual element and omits the textual element (step 915). Here, the second bitmap contains only the non-textual element. Next, the processor 120 generates a third bitmap in the bitmap memory 134 that includes the textual element and omits the non-textual element (step 920). The processor 120 then scans the third bitmap to identify pixels associated with the textual element represented therein and compares pixels in the first bitmap with pixels in the second bitmap that correspond to a vicinity of the identified pixels in the third bitmap (step 925). The processor 120 then identifies a number of compared pixels that match (step 930). The processor 120 may then use the identified number of compared pixels that match to determine an extent to which the textual element is hidden by the non-textual element (step 935).

The processor 120 then generates a fourth bitmap in the bitmap memory 134 that includes the textual element and omits the non-textual element (step 940). The processor 120 then determines if the textual element is hidden (step 945). The processor 120 may make this determination by comparing the extent to which the textual element is hidden by the non-textual element to a threshold, as described above. Since, as noted above, the textual element is completely hidden by the non-textual element, the processor 120, in this embodiment, concludes that the textual element is hidden and sets values associated with the textual element's background and non-background pixels in the fourth bitmap to indicate the textual element is hidden (step 955). The processor 120 then directs the display interface 150 to display the fourth bitmap on the display device 152 (step 960).

FIGS. 10A-D are a flow chart of a sequence of steps that may be used to detect and display one or more textual elements that are hidden. The sequence begins at step 1005 and proceeds to step 1010 where a first bitmap, based on a plurality of graphical elements, is generated. The plurality of graphical elements includes one or more textual elements and one or more non-textual elements. At step 1012, a second bitmap that is based on a first subset of the plurality of graphical elements is generated. The first subset includes the one or more non-textual elements of the plurality of elements and omits the one or more textual elements of the plurality of elements.

At step 1014, a third bitmap based on a second subset of the plurality of graphical elements is generated. The second subset includes the one or more textual elements of the plurality of elements and omits the one or more non-textual elements of the plurality of elements. In an embodiment, a coding scheme is used where non-background pixels associated with a textual element are set to a unique value that identifies a location of the textual element in the fourth bitmap. For example, one coding scheme that may be used includes setting one or more non-background pixels associated with a first textual element in a bitmap to an RGB value of {0, 0, 1}, setting one or more non-background pixels associated with a second textual element to an RGB value of {0, 0, 2} and so on.

As will be described further below, the color assigned to a textual element may be used to locate an entry, in a data structure, that is associated with the textual element. The entry may contain information that indicates whether the textual element is hidden or visible.

At step 1016, a first textual element in the second subset is selected. At step 1018, one or more non-background pixels contained in the third bitmap that are associated with the selected textual element are identified. At step 1020, for each identified non-background pixel in the third bitmap, corresponding pixels in the first and second bitmaps are compared. At step 1022, a check is performed to determine if the selected textual element is hidden based on the results of the compared pixels. As noted above, an extent to which the selected textual element is hidden by a non-textual element may be used to make this determination.

If it is concluded that the selected textual element is hidden, the sequence proceeds to step 1024 where the selected textual element is marked as hidden. Otherwise, it is concluded that the text is visible and the sequence proceeds to step 1026 where the textual element is marked as visible. In an embodiment, a data structure, such as a table, is maintained to keep track of whether a particular textual element is hidden or visible. Here, for each textual element, one or more non-background pixels may be encoded to indicate a location of the textual element in the fourth bitmap, as described above. An encoded non-background pixel for a particular textual element may be used as an index to access a record in the data structure that is associated with the textual element. A field in the record may then be set to indicate whether textual element is hidden or visible.

At step 1028, a check is performed to determine if there are more textual elements in the second subset to process. If so, the sequence proceeds to step 1028 where a next textual element in the second subset is selected. The sequence then returns to step 1018.

If at step 1028, if there are no more textual elements in the second subset to process, the sequence proceeds to step 1030 (FIG. 10C) where a fourth bitmap is generated based on a third subset of the plurality of graphical elements. The third subset includes the one or more textual elements and omits the one or more non-textual elements. Each included textual element is associated with one or more background pixels and one or more non-background pixels in the fourth bitmap. A first textual element in the third bitmap is selected, at step 1032. A check is then performed, at step 1034, to determine if the selected textual element is marked as hidden. This check may be performed by accessing the record associated with the textual element in the above-described data structure to determine if it indicates the element is hidden.

If at step 1034 it is determined the selected textual element is hidden, the sequence proceeds to step 1038 where pixels in the fourth bitmap that are associated with the selected textual element are set to indicate the selected textual element is hidden, as described above. Otherwise, if at step 1034, the selected textual element is visible, the sequence proceeds to step 1036 where pixels in the fourth bitmap that are associated with the selected textual element are set to indicate the selected textual element is visible, as described above.

The sequence then proceeds to step 1040 (FIG. 10D) where a check is performed to determine if there are more textual elements in the third bitmap to process. If so, the sequence proceeds to step 1042 where a next textual element in the third bitmap is selected. The sequence then returns to step 1034.

If at step 1040 it is determined that there are no more textual elements in the third bitmap to process, the sequence proceeds to step 1044 where the fourth bitmap is displayed. The sequence ends at step 1095.

The following example, illustrates an embodiment of the above-described steps as implemented in system 100. For example, assume, as above, that a particular graphic contains a textual element and a non-textual element that completely obscures the textual element. Now referring to FIGS. 1 and 10A-D, in an embodiment, the processor 120 generates a first bitmap in the bitmap memory 134 based on the textual and the non-textual elements contained in the graphic (step 1010). As described above, since the textual element is completely obscured by the non-textual element, the textual element is completely overwritten by the non-textual element in the first bitmap.

The processor 120 then generates a second bitmap in the bitmap memory 134 that includes the non-textual element and omits the textual element (step 1012). Next, the processor 120 generates a third bitmap in the bitmap memory 134 that includes the textual element and omits the non-textual element (step 1014). The processor 120 then selects the textual element in the second subset (step 1016) and identifies non-background pixels contained in the third bitmap that are associated with the selected textual element (step 1018). The processor 120 may identify these pixels by examining pixels in the third bitmap that are associated with the selected textual element to identify background and non-background pixels of the element.

For each identified non-background pixel, the processor 120 compares a corresponding pixel contained in the first bitmap with a corresponding pixel contained in the second bitmap to determine if they match (step 1020). Based on the compared pixels, the processor 120 then determines if the selected textual element is visible (step 1022). Since as noted above, the selected textual element is completely obscured by the non-textual element, the processor 120 concludes that the selected textual element is hidden and marks the element as hidden (step 1024), as described above. The processor 120 then determines if there are more textual elements in the second subset (step 1028). Assuming there are no more textual elements in the second subset, the processor 120 generates a fourth bitmap in the bitmap memory 134 that includes the textual element and omits the non-textual element (step 1030). The processor 120 then selects the textual element (step 1032) and determines if the textual element has been marked as hidden (step 1034).

Since as noted above, the textual element was determined to be hidden, the processor sets background and non-background pixels in the fourth bitmap to indicate the textual element is hidden (step 1038). The processor 120 then determines if there are any more textual elements in the third bitmap that need to be processed (step 1040). Since, as noted above, in this example, the graphic only contains one textual element, the processor 120 concludes there are no more textual elements to process and proceeds to direct the display interface 150 to display the fourth bitmap on the display device 152 (step 1044).

It should be noted that setting the pixels in the fourth bitmap to indicate whether a graphical element is hidden or visible and presenting the bitmap, as described above, enables a user to preview visible and hidden graphical elements in a graphic, readily determine if a particular graphical element is hidden or visible and take appropriate action. For example, after previewing a graphic, the user may decide that certain hidden graphical elements in the graphic should be removed from the graphic.

For example, in an embodiment, an application 136 executed by processor 120 in computer system 100 generates the fourth bitmap and presents the generated bitmap to a user, as described above. The application then allows the user to specify which graphical elements are to be removed from the graphic by selecting the graphical elements with a mouse device or by entering certain key sequences via a keyboard device. The user selects the graphical elements to be removed and indicates to the application 136 to remove them. The application then removes the selected elements from the graphic and saves the updated graphic in a file on data storage device 162.

Figure 11A:
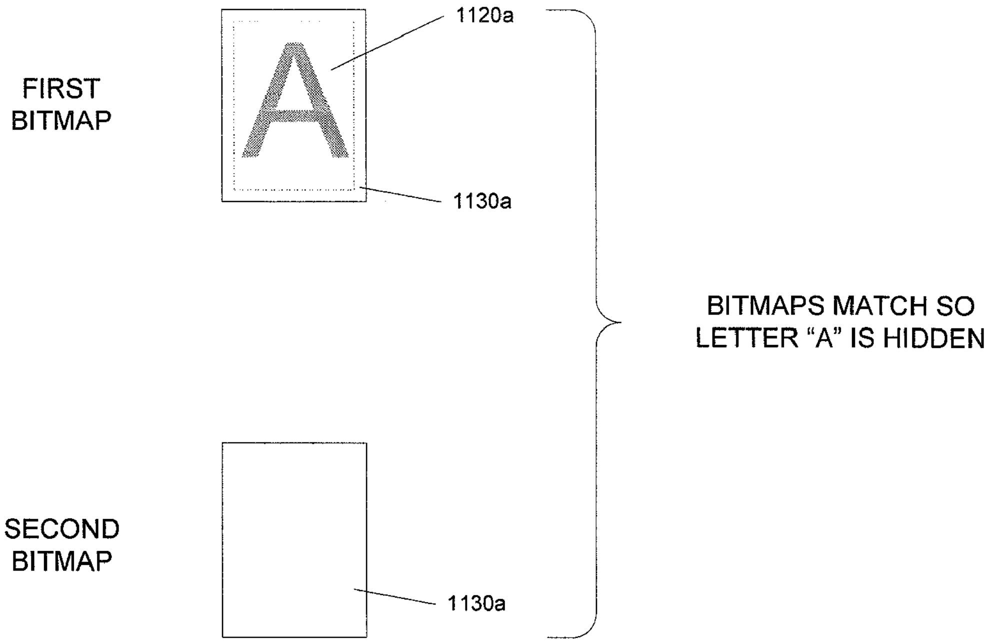
FIGS. 11A-B illustrate examples of the using two bitmaps to determine if a graphical element is hidden.
Figure 11B:
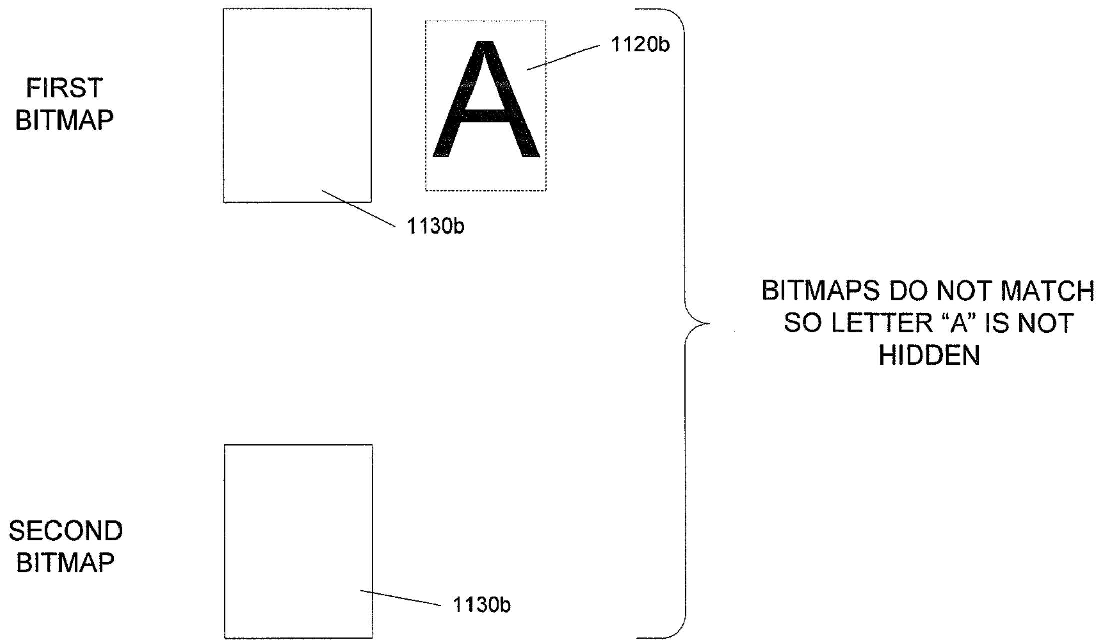

FIGS. 11A-B illustrate examples of the using two bitmaps, as described above, to determine if a graphical element in a graphic is hidden or not hidden. FIG. 11A illustrates an example where a textual element 1120*a* is hidden by a non-textual element 1130*a* in a graphic. Referring to FIG. 11A, the first bitmap is rendered and pixels associated with the textual element 1120*a* are overwritten by the pixels associated with the non-textual element 1130*a*, as described above. Note that, in the illustration, the textual element 1120*a* is shown in a lighter shade to indicate that the textual element 1120*a* is overwritten by the non-textual element 1130*a*. The second bitmap, in this example, is rendered to include only the non-textual element 1130*a*, as described above, and thus the second bitmap contains only pixels associated with the second element 1130*a*. Comparing the two bitmaps results in a match. Since the bitmaps match, the textual element 1120*a* is considered to be hidden by the non-textual element 1130*a*.

FIG. 11B illustrates an example where a textual element 1120*b* is not hidden by a non-textual element 1130*b*. Referring to FIG. 11B, note that in the first bitmap pixels associated with the non-textual element 1130*b* do not overwrite pixels associated with the textual element 1120*b*. In other words, since the non-textual element 1130*b* is not overlaid on top of the textual element 1120*b*, the pixels for the non-textual element 1130*b* are not in the same region in the bitmap as the pixels for textual element 1120*b*. The second bitmap is rendered to include only the non-textual element 1130*b*, as described above. When compared, the two bitmaps do not match. Since the bitmaps do not match the textual element 1120*b* is considered not hidden.

Figure 12A:
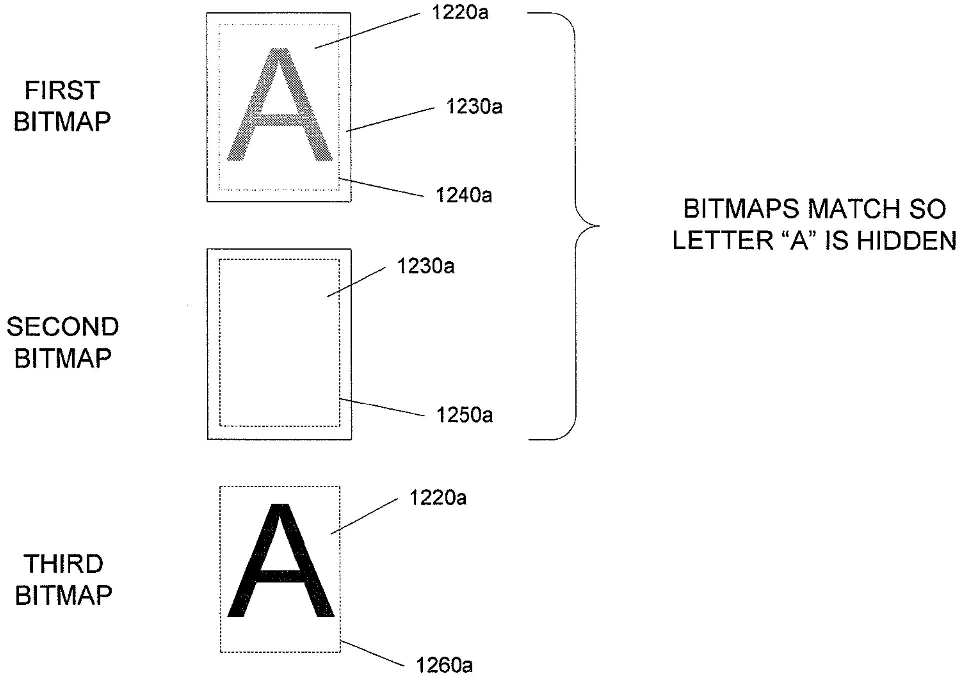
FIGS. 12A-B illustrate examples of using three bitmaps to determine if a graphical element is hidden.
Figure 12B:
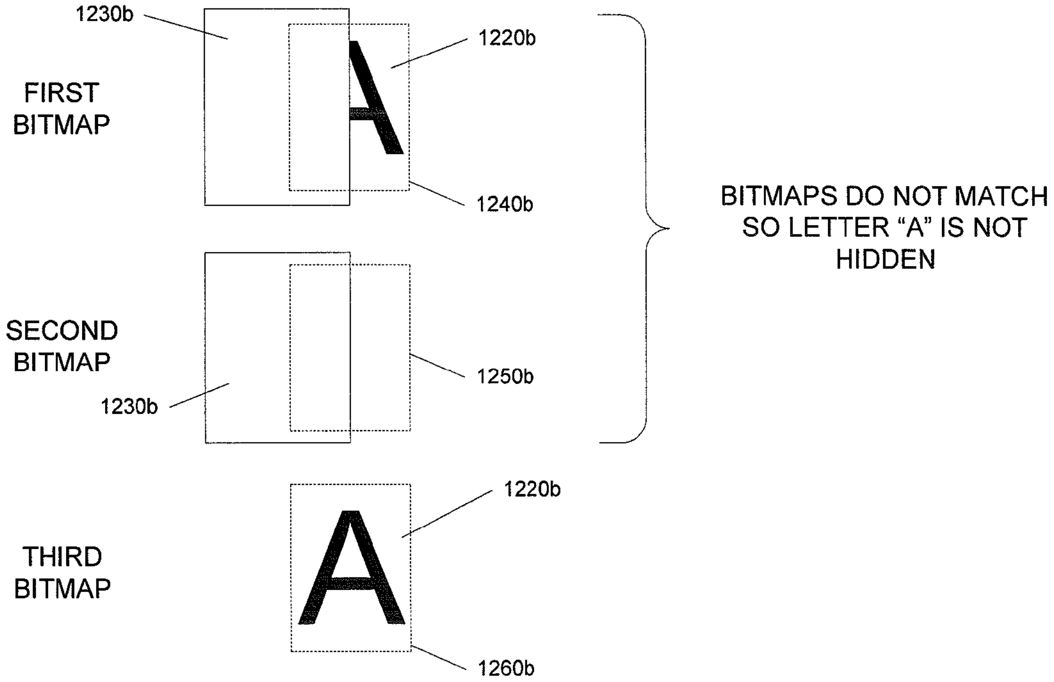

FIGS. 12A-B illustrate examples of using three bitmaps, as described above, to determine if a graphical element in a graphic is hidden or not hidden. In the example illustrated in FIG. 12A, a textual element 1220*a* is completely obscured by a non-textual element 1230*a*. Textual element 1220*a* is illustrated in the first bitmap in a lighter shade to indicate that pixels associated with the element 1220*a* are overwritten by pixels associated with the non-textual element 1230*a*. The second bitmap, in this example, contains only pixels associated with the non-textual element 1230*a*. The third bitmap, in this example, contains only pixels associated with the textual element 1220*a*. Each bitmap contains a region of pixels that correspond to the location of the textual element 1220*a* in the third bitmap. This region is illustrated in the first bitmap as region 1240*a*, in the second bitmap as region 1250*a* and in the third bitmap as region 1260*a*. Non-background pixels in a region 1240*a* in the first bitmap are compared with non-background pixels in a region 1250*a* in the second bitmap to determine if the textual element 1220*a* is hidden. In this example, the compared pixels match so the textual element 1220*a* is considered hidden.

In the example illustrated in FIG. 12B, a textual element 1220*b* is only partially obscured by a non-textual element 1230*b*. Specifically, in the first bitmap, textual element 1220*b* is partially obscured by the non-textual element 1230*b*. As above, the second bitmap, in this example, contains only pixels associated with the non-textual element 1230*b*. Also as above, the third bitmap, in this example, contains only pixels associated with the textual element 1220*b*.

Each bitmap contains a region of pixels that correspond to the location of the textual element 1220*b* in the third bitmap. This region is illustrated in the first bitmap as region 1240*b*, in the second bitmap as region 1250*b* and in the third bitmap as region 1260*b*. Non-background pixels in a region 1240*b* in the first bitmap are compared with non-background pixels in a region 1250*b* in the second bitmap to determine if the textual element 1220*b* is hidden. In this example, the compared pixels do not match so the textual element 1220*b* is considered not hidden (i.e., is considered at least partially visible).

While techniques described herein have been particularly shown and described with reference to particular illustrative embodiments, it is to be understood that various changes in form and details may be made therein without departing from the scope and spirit of the invention. As such, the foregoing description of embodiments of the invention are not intended to be limiting. Rather, any limitations to embodiments of the invention are presented in the following claims.

What is claimed is:

1. A method comprising:

generating a first bitmap based on a plurality of graphical elements;

generating a second bitmap based on a subset of the plurality of graphical elements, the subset omitting a graphical element of the plurality of graphical elements; and comparing the first bitmap with the second bitmap to determine if the graphical element is hidden.

2. A method as defined in claim 1 wherein comparing further comprises:

comparing pixels in the first bitmap with corresponding pixels in the second bitmap; and based on the compared pixels, determining if the graphical element is hidden.

3. A method as defined in claim 2 further comprising:

identifying a number of compared pixels that match; and using the identified number of compared pixels that match to determine an amount by which the graphical element is hidden.

4. A method as defined in claim 3 further comprising:

concluding the graphical element is hidden if the amount exceeds a predetermined threshold.

5. A method as defined in claim 1, wherein the subset is a first subset, the graphical element is a first graphical element and, wherein comparing further comprises:

generating a third bitmap based on a second subset of the plurality of graphical elements, the second subset including the first graphical element and omitting a second graphical element of the plurality of graphical elements; and comparing pixels in the first bitmap with pixels in the second bitmap, the compared pixels corresponding to a location of the first graphical element in the third bitmap.

6. A method as defined in claim 5 further comprising:

generating a fourth bitmap based on a third subset of the plurality of graphical elements, the third subset including the first graphical element and omitting the second graphical element; and setting pixels in the fourth bitmap that are associated with the first graphical element to indicate the first graphical element is hidden if it is determined that the first graphical element is hidden.

7. A method as defined in claim 5 further comprising:

generating a fourth bitmap based on a third subset of the plurality of graphical elements, the third subset including the first graphical element and omitting the second graphical element; and setting pixels in the fourth bitmap that are associated with the first graphical element to indicate the first graphical element is visible if it is determined if the first graphical element is visible.

8. A method as defined in claim 7, wherein one or more pixels in the third bitmap that are associated with the first graphical element indicate a location of the first graphical element in the fourth bitmap.

9. A method as defined in claim 8 further comprising:

using the one or more pixels that indicate the location of the first graphical element in the fourth bitmap to update a data structure to indicate whether the first graphical element is hidden or visible.

10. A method comprising:

generating a first bitmap based on a plurality of graphical elements, the plurality of graphical elements including one or more textual elements and one or more non-textual elements;

generating a second bitmap based on a first subset of the plurality of graphical elements, the first subset omitting the one or more textual elements and including the one or more non-textual elements;

generating a third bitmap based on a second subset of the plurality of graphical elements, the second subset including the one or more textual elements and omitting the one or more non-textual elements, each textual element included in the second subset being associated with one or more background pixels and one or more non-background pixels contained in the third bitmap; and for each textual element included in the second subset:

identifying one or more non-background pixels that are associated with the textual element, for each identified non-background pixel, comparing a corresponding pixel contained in the first bitmap with a corresponding pixel contained in the second bitmap, and concluding the textual element is hidden based on the results of the compared pixels.

11. A method as defined in claim 10 further comprising:

identifying a number of compared pixels that match; and using the identified number of compared pixels that match to determine an amount by which the textual element is hidden.

12. A method as defined in claim 11 wherein concluding further comprises:

comparing the amount to a threshold; and concluding the textual element is hidden if the amount exceeds the threshold.

13. An apparatus comprising:

a bitmap memory; and a processor configured to:

generate a first bitmap in the bitmap memory, the first bitmap being generated based on a plurality of graphical elements, generate a second bitmap in the bitmap memory, the second bitmap being generated based on a subset of the plurality of graphical elements, the subset omitting a graphical element of the plurality of graphical elements, and compare the first bitmap with the second bitmap to determine if the graphical element is hidden.

14. An apparatus as defined in claim 13 wherein the processor is further configured to:

compare pixels in the first bitmap with corresponding pixels in the second bitmap; and based on the compared pixels, determine if the graphical element is hidden.

15. An apparatus as defined in claim 14 wherein the processor is further configured to:

identify a number of compared pixels that match, and use the identified number of compared pixels that match to determine an amount by which the graphical element is hidden.

16. An apparatus as defined in claim 15 wherein the processor is further configured to:

conclude the graphical element is hidden if the amount exceeds a predetermined threshold.

17. An apparatus as defined in claim 15, wherein the subset is a first subset, the graphical element is a first graphical element and, wherein the processor is further configured to:

generate a third bitmap based on a second subset of the plurality of graphical elements, the second subset including the first graphical element and omitting a second graphical element of the plurality of graphical elements; and compare pixels in the first bitmap with pixels in the second bitmap, the compared pixels corresponding to a location of the first graphical element in the third bitmap.

18. An apparatus as defined in claim 17 wherein the processor is further configured to:

generate a fourth bitmap in the bitmap memory, the fourth bitmap being generated based on a third subset of the plurality of graphical elements, the third subset including the first graphical element and omitting the second graphical element, and set pixels in the fourth bitmap that are associated with the first graphical element to indicate the first graphical element is hidden if it is determined that the first graphical element is hidden.

19. An apparatus as defined in claim 17 wherein the processor is further configured to:

generate a fourth bitmap in the bitmap memory, the fourth bitmap being generated based on a third subset of the plurality of graphical elements, the third subset including the first graphical element and omitting the second graphical element, and set pixels in the fourth bitmap that are associated with the first graphical element to indicate the first graphical element is visible if it is determined if the first graphical element is visible.

20. A computer program product including a computer-readable medium having instructions stored thereon for processing data information, such that the instructions, when carried out by a processing device, enable the processing device to perform the operations of:

generating a first bitmap based on a plurality of graphical elements;

generating a second bitmap based on a subset of the plurality of graphical elements, the subset omitting a graphical element of the plurality of graphical elements; and comparing the first bitmap with the second bitmap to determine if the first graphical element is hidden.

* * * * *